United States Patent
Suau

(10) Patent No.: US 9,957,338 B2
(45) Date of Patent: May 1, 2018

(54) METHOD FOR POLYMERIZING METH(ACRYLIC) ACID IN A SOLUTION, POLYMER SOLUTIONS OBTAINED AND USES THEREOF

(71) Applicant: COATEX, Genay (FR)

(72) Inventor: Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 211 days.

(21) Appl. No.: 15/027,632

(22) PCT Filed: Nov. 17, 2014

(86) PCT No.: PCT/FR2014/052929
§ 371 (c)(1),
(2) Date: Apr. 6, 2016

(87) PCT Pub. No.: WO2015/079140
PCT Pub. Date: Jun. 4, 2015

(65) Prior Publication Data
US 2016/0280816 A1 Sep. 29, 2016

(30) Foreign Application Priority Data

Nov. 26, 2013 (FR) ..................... 13 61631

(51) Int. Cl.
*C08F 120/06* (2006.01)
*C08F 20/06* (2006.01)
*C08F 2/38* (2006.01)
*C08K 3/32* (2006.01)

(52) U.S. Cl.
CPC .............. *C08F 120/06* (2013.01); *C08F 2/38* (2013.01); *C08F 20/06* (2013.01); *C08K 3/32* (2013.01)

(58) Field of Classification Search
CPC .......... C08F 120/06; C08F 2/38; C08F 20/06; C08K 3/32
USPC ........................................................ 526/193
See application file for complete search history.

(56) References Cited

U.S. PATENT DOCUMENTS

| 2011/0186773 A1 | 8/2011 | Suau et al. |
| 2012/0214941 A1* | 8/2012 | Kleiner ............... B01J 19/0093 524/832 |
| 2012/0259083 A1 | 10/2012 | Suau et al. |

FOREIGN PATENT DOCUMENTS

WO 2005/095466 A1 10/2005

OTHER PUBLICATIONS

D.V. Vishnevetskii, et al., "Effect of the Chemical Natures of a Monomer and a Leaving Group in Symmetric Trithiocarbonate as a Reversible Addition-Fragmentation Chain-Transfer Agent on the Position of the Trithiocarbonate Group in Macromolecules", Polymer Science Series B, vol. 55, No. 9-10, pp. 515-525, 2013, XP002721530.
International Search Report dated Feb. 13, 2015 in PCT/FR14/052929 Filed Nov. 17, 2014.

* cited by examiner

*Primary Examiner* — Ling Choi
*Assistant Examiner* — Chun-Cheng Wang
(74) *Attorney, Agent, or Firm* — Oblon, McClelland, Maier & Neustadt, L.L.P.

(57) ABSTRACT

The present invention relates to a novel method for solvent-free preparation of a polymer of (meth)acrylic acid in solution, said polymer having a molecular weigh of less than 8,000 g/mol and a polydispersity index (PI) of 2 to 5 by radical polymerization.

9 Claims, No Drawings

METHOD FOR POLYMERIZING METH(ACRYLIC) ACID IN A SOLUTION, POLYMER SOLUTIONS OBTAINED AND USES THEREOF

FIELD OF THE INVENTION

The present invention concerns the technical field of radical polymerization of (meth)acrylic acid. More precisely, the present invention concerns a novel method of radical polymerization, polymers thus obtained and applications thereof in industry.

BACKGROUND OF THE INVENTION

Radical polymerization methods conventionally require that the monomers to be polymerized, a chain transfer agent, a source of free radicals and, optionally, a catalyst are brought into contact in at least one solvent.

The principal objective of a polymerization method is to obtain a polymer having a molecular mass suited to the application for which it is intended. The present invention aims to obtain polymers having a molecular mass of less than 8000 g/mol, for example of about 6000 g/mol.

Various methods of radical polymerization exist.

Mention may be made first of methods employing organic solvents, such as secondary alcohols like isopropanol. These methods are unsatisfactory today because they generate volatile organic compounds (VOCs). On the one hand, these solvents must be removed at the end of the reaction, thus complicating the industrial polymer preparation process. On the other hand, these solvents are recognized as having very harmful effects on health and on the environment, such that their production is sought to be avoided. Lastly, even after purification (distillation), traces of solvent still remain in the polymer solution.

Other methods for synthesizing polyacrylic polymers take place in water and do not generate volatile organic compounds.

Among the various radical polymerization methods, mention may also be made of reversible addition-fragmentation chain transfer (RAFT)-type controlled radical polymerization for carrying out the living polymerization of a monomer. Such a method also makes it possible to obtain polymers having low polydispersity (polymoleculatrity) indices (PI), which makes them particularly effective for certain applications.

To implement a RAFT-type controlled radical polymerization, and thus to obtain a polymer of expected molecular mass having a good PI, it is important to add to the reaction medium an available amount of chain transfer agent, i.e., to employ an amount of chain transfer agent such that each chain to be polymerized is functionalized by a chain transfer agent. Moreover, it is important that this chain transfer agent is already available when polymerization is initiated, i.e., when the polymerization reactor is heated and radicals are generated. This implies that large amounts of chain transfer agent must be employed in a RAFT-type controlled radical polymerization method.

Despite all the advantages of RAFT polymerization, the use of such amounts of chain transfer agent have a certain number of disadvantages.

First, chain transfer agents prove to be expensive products, significantly increasing the cost of the polymer obtained.

Moreover, when sulfur-containing chain transfer agents as described in the documents WO 02/070571, WO 2005/095466 and WO 2006/024706 are used, it is noted that a fraction of these compounds will be broken down to free sulfur-containing by-products of the $CS_2$ and $H_2S$ type and be found in the aqueous solution of the final polymer and in the run-off water of the process, and thus can have a negative impact on humans and on the environment. Moreover, the presence of these sulfur-containing by-products in the aqueous solution, during the use of the polymer, generates gaseous emissions harmful to humans.

Alternative RAFT-type methods of controlled radical polymerization exist. According to one, hydrogen peroxide is used as initiator and, for example, copper sulfate as catalyst and chain transfer agent. Nevertheless, to obtain a polymer having a molecular mass of less than 8000 g/mol, for example of about 6000 g/mol, it is necessary to use a large amount of catalyst, which generates a large amount of polluting by-products.

Alternately, thiolactic acid or another RSH mercaptan is used as an additional chain transfer agent, but, again, in order to obtain a polymer having a molecular mass of less than 8000 g/mol, for example of about 6000 g/mol, it is necessary to use large amounts of thiolactic acid or, more generally, transfer agent.

Still other methods rely on sodium hypophosphite, having the chemical formula $NaPO_2H_2$, as chain transfer and reduction-oxidation agent, in the presence of hydrogen peroxide or radical generator. The document GB 771 573 A1 notably describes one such method. It has the major disadvantage of requiring large amounts of sodium hypophosphite, a phosphorus fraction being found grafted in the polymer, another phosphorus fraction being found in the form of phosphate salts in the process water. This is, first, a disadvantage during the use of the polymer and, second, an environmental pollutant.

BRIEF DESCRIPTION OF THE INVENTION

One object of the present invention is to propose a method for preparing a (meth)acrylic acid polymer having a molecular mass of less than 8000 g/mol, for example of less than 7000 g/mol, this method making it possible to obtain an aqueous polymer solution containing fewer carbon bisulfide- or hydrogen sulfide-type by-products, so as to reduce the risks to humans and to the environment during the synthesis of the polymer, but also during the use of the polymer solution.

Still another object of the present invention is to reduce in the process water the amount of pollutants associated with the use of reagents containing sulfur and phosphorus.

Another object of the present invention is to propose a method for preparing a polyacrylic polymer without solvent, i.e., one that does not generate volatile organic compounds.

Still another object of the present invention is to propose a method for producing a polymer having a good PI while controlling the costs associated with the method.

Another object of the present invention is to propose a method for producing an aqueous polymer solution containing few unpolymerized monomers.

DETAILED DESCRIPTION OF THE INVENTION

The Inventor has developed a solvent-free method for preparing a (meth)acrylic acid polymer in solution, said polymer having a molecular mass of less than 8000 g/mol and a polydispersity index (PI) between 2 and 5, for example between 2 and 3, comprising the following steps:

a) water is introduced into a synthesis reactor,
b) the reactor is heated to a temperature of at least 60° C.,
c) the following compounds are introduced into the reactor in a continuous and simultaneous manner:
   c1) the (meth)acrylic monomer(s) to be polymerized,
   c2) a polymerization initiator system,
   c3) a compound of formula (I):

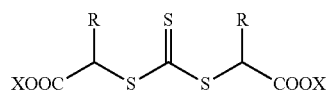

(I)

according to which:
X represents Na, K or H, and
R represents an alkyl chain comprising 1 to 5 carbon atoms, in an amount such that the mass percentage (weight/weight) between said compound of formula (I) and said (meth)acrylic monomer(s) is between 0.1 and 2.5%,
method according to which, during step a) and/or step c), sodium hypophosphite $NaPO_2H_2$ or a derivative thereof is introduced into the synthesis reactor in a total amount such that the mass percentage (weight/weight) between $NaPO_2H_2$ and said (meth)acrylic monomers is between 2.9 and 5.8% by weight.

The method of the present invention indeed makes it possible to obtain polymers having a molecular mass of less than 8000 g/mol, for example of less than 7000 g/mol, for example of about 6000 g/mol.

According to an embodiment of the present invention, the polymers have a molecular mass of more than 500 g/mol, for example of more than 1000 g/mol.

The method of the present invention is carried out without organic solvent. By "solvent" or "organic solvent" is meant any substance that is inert with respect to liquid-phase reagents and reaction products at its temperature of use, the function of which is to dilute other substances without chemically modifying them and without modifying itself.

It will be noted that the method of the present invention is not a RAFT-type radical polymerization method due, first, to the amount of the compound of formula (I) used and, second, to the order in which the reagents are introduced into the synthesis reactor. Thus, the method of the present invention makes it possible to obtain an aqueous polymer solution that, advantageously, on the one hand, comprises fewer sulfur-containing (meth)acrylic acid polymers than a polymer solution obtained from a RAFT-type radical polymerization method; on the other hand, the solution itself obtained by the method contains fewer $H_2S$- or $CS_2$-type reaction by-products than the polymer solution obtained from a RAFT-type radical polymerization method. Although the polydispersity index of the poly(meth)acrylic polymer obtained is higher than that obtainable by means of a RAFT-type radical polymerization method, such an aqueous polymer solution obtained according to the method of the present invention has a higher degree of purity than a solution obtained by a RAFT-type radical polymerization method.

Thus, the method of the invention makes it possible to reduce the contamination of the polymer obtained and the production of $CS_2$- or $H_2S$-type polluting by-products due to the fact that the mass percentage between the compound of formula (I) and the monomers to be polymerized is reduced to a value between 0.1 and 2.5%.

The method of the present invention also makes it possible to solve one of the major technical problems of the present invention, namely to propose a method for preparing a polymer having a molar mass of less than 8000 g/mol, for example of less than 6000 g/mol.

The method of the present invention also has the advantage of enabling a higher conversion rate in an industry-acceptable reaction time. According to an embodiment of the method of the invention, the reaction time of step c) is less than 4 hours, for example less than 3 hours.

Step c) of the method of the present invention also employs a polymerization initiator system.

By "polymerization initiator system" is meant a system capable of initiating the polymerization of monomers. It is conventionally a chemical compound having the ability to generate free radicals.

According to an aspect of the present invention, the polymerization initiator system c2) is selected from the group consisting of hydrogen peroxide, sodium persulfates, potassium persulfates, ammonium persulfates, hydroperoxides and a mixture of at least two of these compounds.

According to an aspect of the present invention, the polymerization initiator system c2) is hydrogen peroxide.

Step c) of the method of the present invention also employs at least one compound of formula (I):

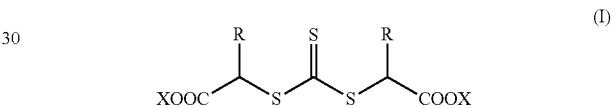

(I)

formula (I) according to which:
X represents Na, K or H, and
R represents an alkyl chain comprising 1 to 5 carbon atoms.

By "alkyl chain comprising 1 to 5 carbon atoms" is meant a methyl, ethyl, propyl, isopropyl, butyl, tert-butyl, isobutyl or pentyl chain.

According to the present invention, the mass percentage (weight/weight) between said compound of formula (I) and said (meth)acrylic monomer(s) is between 0.1 and 2.5%.

According to an embodiment of the present invention, the mass percentage (weight/weight) between said compound of formula (I) and said (meth)acrylic monomer(s) is between 0.15 and 2%.

According to another embodiment of the present invention, the mass percentage (weight/weight) between said compound of formula (I) and said (meth)acrylic monomer(s) is between 0.15 and 1.5%.

According to an embodiment of the present invention, said compound of formula (I) is the compound (IV), i.e., the compound (I) wherein X represents Na and R represents $CH_3$, and the mass percentage (weight/weight) between said compound of formula (I) and said (meth)acrylic monomer(s) is between 0.1 and 1.75%, for example between 0.5 and 1.5%.

According to another embodiment of the present invention, said compound of formula (1) is the compound (1V), i.e., the compound (1) wherein X represents Na and R represents $CH_3$, and the mass percentage (weight/weight) between said compound of formula (I) and said (meth) acrylic monomer(s) is between 0.15 and 1.5%.

The limits of these ranges are within the scope of the present invention.

The constituents are introduced into the synthesis reactor "continuously," i.e., at a constant or variable rate without stopping.

Also, the constituents are introduced into the synthesis reactor "simultaneously," i.e., the various constituents are introduced concomitantly.

According to an embodiment of the method of the present invention, the constituents are introduced into the synthesis reactor "proportionally," i.e., the proportion of each constituent of the mixture introduced into the synthesis reactor remains constant during the reaction time, with respect to the other constituents of the mixture.

By "the (meth)acrylic monomer(s) to be polymerized" is meant that the method of the invention aims to produce either a polymer consisting exclusively of acrylic acid (acrylic acid homopolymer), or a polymer consisting exclusively of methacrylic acid (methacrylic acid homopolymer) or, alternately, a polymer consisting of a mixture of acrylic acid and methacrylic acid (acrylic acid-methacrylic acid copolymer). In the latter case, according to an aspect of the invention, the molar ratio between acrylic acid and methacrylic acid can vary between 1:100 and 100:1, for example between 1:1 and 100:1, or between 1:1 and 50:1.

According to another aspect of the present invention, said compound of formula (I) is dipropyl trithiocarbonate (DPTTC, CAS No. 6332-91-8) or its salts, for example its disodium salt (sodium dipropionate trithiocarbonate, CAS No. 86470-33-2, Mw=298.31 g/mol), as represented by the formula (IV) below:

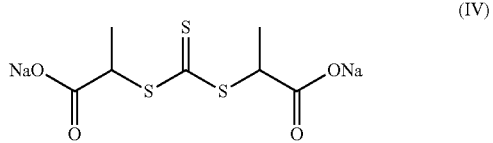

(IV)

The method of the invention is also characterized in that, during step a) and/or step c), sodium hypophosphite $NaPO_2H_2$ or a derivative thereof is introduced into the synthesis reactor in a total amount such that the mass percentage (weight/weight) between $NaPO_2H_2$ and said (meth)acrylic monomer(s) is between 2.9 and 5.8% by weight.

It is possible to use in the method of the invention any form of sodium hypophosphite, hydrated or not. For example, sodium hypophosphite anhydrous $NaPO_2H_2$ or sodium hypophosphite monohydrate $NaPO_2H_2.H_2O$ can be used. In this case, the amount used is such that the mass percentage (weight/weight) between $NaPO_2H_2.H_2O$ and said (meth)acrylic monomer(s) is between 3.5 and 7% by weight.

According to an aspect of the present invention, sodium hypophosphite $NaPO_2H_2$ is introduced into the reactor in a total amount such that the mass percentage (weight/weight) between $NaPO_2H_2$ and said (meth)acrylic monomer(s) is between 3.3 and 5.4% by weight.

According to another aspect of the present invention, sodium hypophosphite $NaPO_2H_2$ is introduced into the reactor in a total amount such that the mass percentage (weight/weight) between $NaPO_2H_2$ and said (meth)acrylic monomer(s) is between 4.1 and 5.4% by weight.

According to an aspect of the method of the present invention, all of the sodium hypophosphite is introduced into the synthesis reactor during step a).

The polymers are generally characterized by two indices/magnitudes/values:

polymolecularity index (PI; also called polydispersity, PD); and molecular mass by weight.

The polymolecularity index corresponds to the molar mass distribution of the various macromolecules within the polymer.

If all the macromolecules have the same length (and thus the same molecular mass), this index is close to 1. If, on the other hand, the macromolecules have different lengths (thus different molecular masses), the PI is greater than 1.

So that the polymer is effective in various applications, it is generally attempted to bring the PI value as close to 1 as possible.

Nevertheless, in the context of the present invention, it is sought to obtain a polymer in solution containing few reaction by-products and a "good PI." By "good PI" is meant a PI between 2 and 5, in particular between 1.5 and 2.8.

According to the present invention, the polymer in solution obtained according to the method described has a molecular mass of less than 8000 g/mol and a polydispersity index (PI) between 2 and 3.

According to an aspect of the present invention, the reaction conditions are such that the conversion rate of the monomers to be polymerized is greater than 98.8%.

In other words, the (meth)acrylic acid polymer solution obtained contains unpolymerized (meth)acrylic monomer(s) in an amount of less than 1.2% by weight, as determined by high-performance liquid chromatography (HPLC).

The amount of residual monomers (acrylic acid or methacrylic acid) can be evaluated by high-pressure liquid chromatography (HPLC). In this method, the constituent components of the mixture are separated on a stationary phase and detected by a UV detector. Once the detector is calibrated, the amount of residual (meth)acrylic acid can be obtained from the area of the peak corresponding to the acrylic compound. This method is described in particular in the manual "*Chimie Organique Expérimentale*" by M. Chavanne, A. Julien, G. J. Beaudoin, E. Flamand, $2^{nd}$ Edition, Editions Modulo, Chapter 18, pp. 271-325.

According to another aspect of the present invention, the reaction conditions are such that the conversion rate of the monomers to be polymerized is above 99.7%. In this case, the amount of residual monomers is less than 0.3% or less than 3000 ppm (dry/dry).

According to another aspect of the present invention, the reaction conditions are such that the conversion rate of the monomers to be polymerized is above 99.9%. In this case, the amount of residual monomers is less than 0.1% or less than 1000 ppm (dry/dry).

According to an aspect of the invention, the (meth)acrylic acid polymer solution obtained contains phosphate ions ($HPO_4^{2-}$) in an amount of less than 0.4% by weight, as determined by ion chromatography.

According to an aspect of the present invention, according to step b) of the method, the reactor is heated to a temperature of at least 80° C., for example 90° C. or 95° C.

According to another aspect of the invention, the method does not comprise any step of removing the reaction by-products after the polymerization step c).

Another object of the present invention resides in the use of a compound of formula (I):

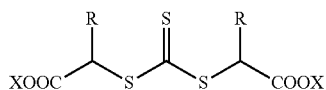

wherein:

X represents Na, K or H, and

R represents an alkyl chain comprising 1 to 5 carbon atoms, as a replacement for part of the sodium hypophosphite NaPO$_2$H$_2$ in a solvent-free method for preparing a (meth)acrylic acid polymer in solution, said polymer having a molecular mass of less than 8000 g/mol and a polydispersity index (PI) between 2 and 3.

According to an aspect of the invention, the solvent-free method for preparing said (meth)acrylic acid polymer in solution is carried out under conditions such that:

the mass percentage (weight/weight) between said compound of formula (I) and said (meth)acrylic monomer(s) is between 0.1 and 2.5%, and the mass percentage (weight/weight) between NaPO$_2$H$_2$ and said (meth)acrylic monomer(s) is between 2.9 and 5.8% by weight.

Another object of the invention is the use of sodium hypophosphite NaPO$_2$H$_2$ or a derivative thereof and a compound of formula (I):

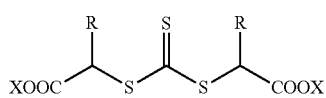

according to which:

X represents Na, K or H and

R represents an alkyl chain comprising 1 to 5 carbon atoms, to prepare a (meth)acrylic acid polymer in solution, said polymer having a molecular mass of less than 8000 g/mol and a polydispersity index (PI) between 2 and 5.

EXAMPLES

In each of the following examples the molecular mass of the polymers according to the invention is determined by size-exclusion chromatography (SEC).

One such technique employs a liquid chromatography device of Waters™ trademark fitted with a detector. This detector is a refractometric concentration detector of Waters™ trademark.

This liquid chromatography equipment is fitted with a size-exclusion column suitably chosen by the skilled person for separating the various molecular weights of the polymers under study.

The elution's liquid phase is an aqueous phase adjusted to pH 9.00 with 1 N sodium hydroxide containing 0.05 M NaHCO$_3$, 0.1 M NaNO$_3$, 0.02 M triethanolamine and 0.03% NaN$_3$.

In detail, according to a first step, the polymerization solution is diluted to 0.9%, dry basis, in the SEC solubilization solvent, which corresponds to the SEC elution's liquid phase, to which 0.04% dimethylformamide is added as flow marker or internal standard. The mixture is then passed through a 0.2 μm filter. 100 μl is then injected into the chromatography device (eluent: an aqueous phase adjusted to pH 9.00 with 1 N sodium hydroxide containing 0.05 M NaHCO$_3$, 0.1 M NaNO$_3$, 0.02 M triethanolamine and 0.03% NaN$_3$).

The liquid chromatography device contains an isocratic pump (Waters™ 515), the flow rate of which is set at 0.8 ml/min. The chromatography device also comprises an oven, which itself comprises the following system of columns, in series: a precolumn of the Waters™ Ultrahydrogel Guard Column type having a length of 6 cm and an inner diameter of 40 mm, and a linear column of the Waters™ Ultrahydrogel type having a length of 30 cm and an inner diameter of 7.8 mm. The detection system, in turn, consists of a refractometric detector of the Waters™ 410 RI type. The oven is heated to a temperature of 60° C. and the refractometer is heated to 45° C.

The chromatography device is calibrated with sodium polyacrylate powder standards of various molecular masses certified for the supplier: Polymer Standards Service or American Polymer Standards Corporation.

The polydispersity index (PI) of the polymer is the ratio of the weight-average molecular mass Mw to the number-average molecular mass Mn.

The amount of residual monomers is measured using conventional techniques known to the skilled person, for example high-pressure liquid chromatography (HPLC).

Example 1

The purpose of this example is to illustrate the preparation of (meth)acrylic acid polymers according to the invention, using:

a dipropionate trithiocarbonate (DPTTC) salt with a mass percentage (weight/weight) between said DPTTC salt and said (meth)acrylic monomer(s) between 0.1 and 2.5% (invention) or outside this range (prior art or outside the invention), and sodium hypophosphite NaPO$_2$H$_2$ in a total amount such that the mass percentage (weight/weight) between NaPO$_2$H$_2$ and said (meth)acrylic monomer(s) is between 2.9 and 5.8% by weight (invention) or outside this range (prior art or outside the invention).

Test 1-Prior Art:

This test illustrates a method for preparing a polymer by means of a RAFT-type controlled radical polymerization.

Into the glass synthesis reactor fitted with a mechanical stirrer and an oil bath-type heater are loaded 328 g of water and 94 g of 29% DPTTC chain transfer agent (or 27 g of 100% DPTTC, or 0.092 mole).

Heat is applied until a temperature of 95° C. is reached.

One introduces, over a period of 2 hours, 328 g of 100% acrylic acid (or 4.558 moles) and, in parallel:

4 g of sodium persulfate Na$_2$S$_2$O$_8$ (or 0.017 mole) dissolved in 76 g of water, and 1.15 g of sodium metabisulfite Na$_2$S$_2$O$_5$ (or 0.006 mole) dissolved in 76 g of water.

The temperature is maintained for 2 hours and then 3.2 g of 130 V hydrogen peroxide diluted in 46 g of water is injected.

The mixture is then neutralized under stirring with 381 g of 50% sodium hydroxide diluted in 48 g of water.

Cooking resumes for 1 hour at 95° C., followed by cooling to room temperature.

Test 2-Outside the Invention:

According to this test, the conditions of Test 1 are reproduced while decreasing by a factor of 10 the amount of DPTTC chain transfer agent used.

Into the glass synthesis reactor fitted with a mechanical stirrer and an oil bath-type heater are loaded 328 g of water and 19 g of 14% DPTTC chain transfer agent (or 2.7 g of 100% DPTTC or 0.0092 mole).

Heat is applied until a temperature of 95° C. is reached.

One introduces, over a period of 2 hours, 328 g of 100% acrylic acid (or 4.558 moles) and, in parallel:
- 4 g of sodium persulfate $Na_2S_2O_8$ (or 0.017 mole) dissolved in 76 g of water, and
- 1.15 g of sodium metabisulfite $Na_2S_2O_5$ (or 0.006 mole) dissolved in 76 g of water.

The temperature is maintained for 2 hours and then 3.2 g of 130 V hydrogen peroxide diluted in 46 g of water is injected.

The mixture is then neutralized under stirring with 381 g of 50% sodium hydroxide diluted in 48 g of water.

Cooking resumes for 1 hour at 95° C., followed by cooling to room temperature.

Test 3-Prior Art:

This test corresponds to Test 2 of Example 2 of the document WO 2005/095466 (Coatex).

Into the synthesis reactor fitted with a mechanical stirrer and an oil bath-type heater are loaded 150 g of water, 20.31 g of 14.4% DPTTC chain transfer agent (or 2.92 g of 100% DPTTC) and 50 g of 100% acrylic acid.

The source of free radicals is then added, in this case 0.4 g of V501. Heat is applied until a temperature of 95° C. is reached. The temperature is maintained for 2 hours, followed by cooling to room temperature.

The mixture is then neutralized with 55 g of 50% sodium hydroxide.

Test 4-Prior Art:

This test illustrates a method for preparing a polymer exclusively with sodium hypophosphite monohydrate.

Water (209 g) is loaded into a synthesis reactor fitted with a mechanical stirrer and an oil bath-type heater. Iron sulfate heptahydrate (0.1 g) and copper sulfate pentahydrate (0.015 g) are added.

The medium is heated to 90° C., then the following are added simultaneously and continuously over a period of 2 hours:
- 305 g of acrylic acid and 13 g of water, and
- 25.6 g of $NaPO_2H_2.H_2O$ dissolved in 32 g of water.

The mixture is cooked at 90° C. for 90 minutes.

The mixture is then neutralized to pH 8 with 50% sodium hydroxide.

Test 5-Invention:

Into a synthesis reactor fitted with a mechanical stirrer and an oil bath-type heater are loaded 198 g of water and 13 g of $NaPO_2H_2.H_2O$ (or 10.8 g of $NaPO_2H_2$).

The medium is heated to 90° C., then the following are added simultaneously and continuously:
- over a period of 90 minutes:
  - 208.6 g of acrylic acid diluted with 23.2 g of water,
  - a stock solution of 13.41 g of 14% DPTTC disodium salt (or 1.88 g of 100% DPTTC),
- over a period of 130 minutes, 7.44 g of 130 V hydrogen peroxide diluted in 132 g of water.

The mixture is cooked at 90° C. for 90 minutes.

The mixture is neutralized with 228 g of 50% sodium hydroxide.

Test 6-Invention:

Into a synthesis reactor fitted with a mechanical stirrer and an oil bath-type heater are loaded 198 g of water and 12 g of $NaPO_2H_2.H_2O$.

The medium is heated to 90° C., then the following are added simultaneously and continuously:
- over a period of 90 minutes:
  - 208.6 g of acrylic acid diluted with 23.2 g of water,
  - a stock solution of 13.41 g of 14% DPTTC disodium salt (or 1.88 g of 100% DPTTC),
- over a period of 130 minutes, 7.44 g of 130 V hydrogen peroxide diluted in 132 g of water.

The mixture is cooked at 90° C. for 90 minutes.

The mixture is neutralized with 228 g of 50% sodium hydroxide.

Test 7-Invention:

Water (198 g) is loaded into a synthesis reactor fitted with a mechanical stirrer and an oil bath-type heater.

The medium is heated to 90° C., then the following are added simultaneously and continuously:
- over a period of 120 minutes:
  - 208.6 g of acrylic acid,
  - a stock solution of 10.29 g of 20% DPTTC disodium salt (or 2.05 g of 100% DPTTC),
  - 12.1 g of $NaPO_2H_2.H_2O$ dissolved in 40 g of water.
- over a period of 130 minutes, 7.1 g of 130 V hydrogen peroxide diluted in 80 g of water.

The mixture is cooked at 90° C. for 90 minutes.

The mixture is neutralized with 228 g of 50% sodium hydroxide.

Test 8-Invention:

Into a synthesis reactor fitted with a mechanical stirrer and an oil bath-type heater are loaded 198 g of water and 6.0 g of $NaPO_2H_2.H_2O$.

The medium is heated to 90° C., then the following are added simultaneously and continuously:
- over a period of 120 minutes:
  - 208.6 g of acrylic acid,
  - a stock solution of 10.3 g of 20% DPTTC disodium salt (or 2.06 g of 100% DPTTC),
  - 6.0 g of $NaPO_2H_2.H_2O$ dissolved in 40 g of water.
- over a period of 130 minutes, 7.1 g of 130 V hydrogen peroxide diluted in 90 g of water.

The mixture is cooked at 90° C. for 90 minutes.

The mixture is neutralized with 228 g of 50% sodium hydroxide.

Test 9-Invention:

Into a synthesis reactor fitted with a mechanical stirrer and an oil bath-type heater are loaded 198 g of water and 10.4 g of $NaPO_2H_2.H_2O$.

The medium is heated to 90° C., then the following are added simultaneously and continuously:
- over a period of 120 minutes:
  - 208.6 g of acrylic acid,
  - a stock solution of 15.6 g of 20% DPTTC disodium salt (or 3.12 g of 100% DPTTC),
- over a period of 130 minutes, 7.1 g of 130 V hydrogen peroxide diluted in 90 g of water.

The mixture is cooked at 90° C. for 90 minutes.

The mixture is neutralized with 228 g of 50% sodium hydroxide.

Test 10-Invention:

Into a synthesis reactor fitted with a mechanical stirrer and an oil bath-type heater are loaded 198 g of water and 8.3 g of $NaPO_2H_2.H_2O$.

The medium is heated to 90° C., then the following are added simultaneously and continuously:
- over a period of 120 minutes:
  - 208.6 g of acrylic acid,
  - a stock solution of 15.6 g of 20% DPTTC disodium salt (or 3.12 g of 100% DPTTC),
- over a period of 130 minutes, 7.1 g of 130 V hydrogen peroxide diluted in 90 g of water.

The mixture is cooked at 90° C. for 90 minutes.
The mixture is neutralized with 228 g of 50% sodium hydroxide.

Test 11-Invention:

Into a synthesis reactor fitted with a mechanical stirrer and an oil bath-type heater are loaded 198 g of water and 10.4 g of $NaPO_2H_2.H_2O$.

The medium is heated to 90° C., then the following are added simultaneously and continuously:
over a period of 120 minutes:
208.6 g of acrylic acid,
a stock solution of 26.1 g of 20% DPTTC disodium salt (or 5.22 g of 100% DPTTC),
over a period of 130 minutes, 7.1 g of 130 V hydrogen peroxide diluted in 90 g of water.

The mixture is cooked at 90° C. for 90 minutes.
The mixture is neutralized with 228 g of 50% sodium hydroxide.

TABLE 1

| Test no. | INVention Prior Art | Mass % DPTTC/ monomers | Mass % $NaPO_2H_2$/ monomers | Mw (g/mol) | PI | SC (%) | pH | Residual AAs (%) |
|---|---|---|---|---|---|---|---|---|
| 1 | PA | 8.23 | n/a | 5065 | 1.5 | 36.6 | 9 | 0.13 |
| 2 | Outside INV | 0.82 | n/a | 43400 | 3.5 | 36.6 | 8.5 | 0.03 |
| 3 | PA | 5.8 | n/a | 4947 | 1.55 | 36.6 | 9 | 0.5 |
| 4 | PA | n/a | 7.0 | 4780 | 2.3 | 40.0 | 8.0 | 0.02 |
| 5 | INV | 0.9 | 5.17 | 4830 | 2.2 | 36.6 | 6.89 | 0.03 |
| 6 | INV | 0.9 | 4.77 | 5325 | 2.3 | 36.6 | 7.02 | 0.04 |
| 7 | INV | 0.98 | 4.77 | 7900 | 2.9 | 37.1 | 7.1 | <0.001 |
| 8 | INV | 0.98 | 4.77 | 5500 | 2.3 | 37.0 | 7.1 | <0.001 |
| 9 | INV | 1.5 | 4.14 | 5760 | 2.4 | 39.2 | 7.0 | 0.15 |
| 10 | INV | 1.5 | 3.30 | 7050 | 2.6 | 38.2 | 6.9 | 0.22 |
| 11 | INV | 2.5 | 4.14 | 5750 | 2.3 | 38.1 | 7.2 | 1.26 | n/a: not applicable

Example 2

The purpose of this example is to illustrate the carbon bisulfide, hydrogen sulfide and phosphate ion contents of various samples employing polymer solutions of the prior art or polymer solutions according to the present invention.

The various samples are analyzed using an Agilent G1530 gas chromatograph coupled to an Agilent G2577A mass spectrometer detector. The injection is by means of an Agilent G1888 headspace sampler. An Agilent HP5 column (30 m×0.25 mm×1 µm; 5% phenyl and 95% methylsiloxane phase) is used, which allows elution of the analytes. The analysis is carried out with 2 grams of sample as-is. The quantification is carried out using the standard addition method.

The various samples are also analyzed using a Metrohm 761 Compact IC ion chromatograph equipped with a conductivity detector, a chemical suppressor and a $CO_2$ suppressor. A Metrohm A Supp 5 250 anion-exchange column and two precolumns (Metrohm A supp5 and RP) are used to elute the anions, among which $HPO_4^{2-}$.

The analysis is carried out with 0.1 g of sample diluted in 60 g of distilled water. The quantification is carried out using external standards.

Three syntheses are carried out:
a polyacrylic dispersant prepared by means of a RAFT-type controlled radical polymerization method, according to Test 1 of Example 1 above,
a polyacrylic dispersant prepared by means of a polymerization method according to Test 4 of Example 1 above,
a polyacrylic acid polymer solution prepared by means of a method according to the present invention, according to Test 6 of Example 1 above.

Samples 1, 2 and 3, respectively, are obtained.
The results of the analyses of these samples are presented in Table 1 below.

TABLE 2

| Samples | INVention Prior Art | $HPO_4^{2-}$ content (ppm) | $H_2S$ content (ppm) | $CS_2$ content (ppm) |
|---|---|---|---|---|
| 1 | PA - RAPT | ND | 200 | 1000 |
| 2 | PA - hypo | 5.032 | ND | ND |
| 3 | INV | 3.500 | ND | ND |

ND: not detectable

The analysis of Sample 1, i.e., a polyacrylic dispersant obtained by means of a RAFT method, indicates high contents of sulfur-containing by-products $H_2S$ and $CS_2$, which is a major disadvantage due to their toxicity.

The analysis of Sample 2, i.e., a polyacrylic dispersant prepared by means of a method of the prior art with a high $NaPO_2H_2$ content, indicates a high residual $HPO_4^{2-}$ ion content (5032 ppm).

The analysis of Sample 3, namely a polyacrylic acid polymer solution prepared by means of a method according to the present invention, shows that the $H_2S$ and $CS_2$ contents are not detectable. The phosphate ion content for identical molecular masses is substantially lower than that of the polymer of Sample 2. Thus, the risks to humans and to the environment during the synthesis of the polymer, but also during the use of the polymer solution, are significantly reduced.

The invention claimed is:

1. A method for preparing a (meth)acrylic acid polymer in solution, the polymer having a weight-averaged molecular weight of less than 8000 g/mol and a polydispersity index (PI) between 2 and 5, the method comprising:

a) introducing water into a synthesis reactor, b) heating the reactor to a temperature of at least 60° C., c) introducing the following compounds into the reactor in a continuous and simultaneous manner:

c1) one or more (meth)acrylic monomers to be polymerized, c2) a polymerization initiator system, c3) a compound of formula (I):

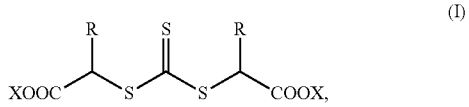

wherein X represents Na, K or H, and R represents an alkyl chain comprising 1 to 5 carbon atoms, in an amount such that the mass percentage (weight/weight) between the compound of formula (I) and the one or more (meth)acrylic monomers is between 0.1 and 2.5%, wherein during a) and/or c), sodium hypophosphite $NaPO_2H_2$ or a derivative thereof is introduced into the synthesis reactor in a total amount such that the mass percentage (weight/weight) between $NaPO_2H_2$ and the one or more (meth)acrylic monomers is between 2.9 and 5.8% by weight.

2. The method as claimed in claim 1, according to which the polymerization initiator system c2) is hydrogen peroxide.

3. The method as claimed in claim 1, wherein the mass percentage (weight/weight) between the compound of formula (I) and the one or more (meth)acrylic monomers is between 0.15 and 2%.

4. The method as claimed in claim 1, wherein the method does not comprise any removing of the reaction by-products after the polymerization c).

5. The method as claimed in claim 1, wherein sodium hypophosphite $NaPO_2H_2$ is introduced into the reactor in a total amount such that the mass percentage (weight/weight) between sodium hypophosphite $NaPO_2H_2$ or a derivative thereof and the one or more (meth)acrylic monomers is between 3.3 and 5.4% by weight.

6. The method as claimed in claim 1, wherein all of the sodium hypophosphite is introduced into the synthesis reactor during a).

7. The method as claimed in claim 1, wherein the (meth)acrylic acid polymer solution obtained comprises one or more unpolymerized (meth)acrylic monomers in an amount of less than 1.2% by weight, as determined by high-performance liquid chromatography (HPLC).

8. The method as claimed in claim 1, wherein the (meth)acrylic acid polymer solution obtained comprises phosphate ions $HPO_4^{2-}$ in an amount of less than 0.4% by weight, as determined by ion chromatography.

9. The method as claimed in claim 1, wherein the compound of formula (I) is such that R is $CH_3$ and X is Na.

* * * * *